(12) United States Patent
Hess et al.

(10) Patent No.: US 11,378,934 B2
(45) Date of Patent: Jul. 5, 2022

(54) SHADOW FUNCTION FOR PROTECTION MONITORING SYSTEMS

(71) Applicant: Baker Hughes Oilfield Operations LLC, Houston, TX (US)

(72) Inventors: Dustin Hess, Minden, NV (US); Paul Richetta, Gardnerville, NV (US); Raymond Jensen, Gardnerville, NV (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/014,494

(22) Filed: Sep. 8, 2020

(65) Prior Publication Data
US 2021/0072723 A1 Mar. 11, 2021

Related U.S. Application Data (60) Provisional application No. 62/897,948, filed on Sep. 9, 2019.

(51) Int. Cl.
G05B 19/406 (2006.01)
G05B 23/02 (2006.01)

(52) U.S. Cl.
CPC ....... G05B 19/406 (2013.01); G05B 23/0218 (2013.01)

(58) Field of Classification Search
None
See application file for complete search history.

(56) References Cited

U.S. PATENT DOCUMENTS 6,046,685 A * 4/2000 Tubel ............... E21B 23/03
                                                  137/606
7,813,820 B2 10/2010 Opem et al.
(Continued)

FOREIGN PATENT DOCUMENTS

CN 102096401 A 6/2011

OTHER PUBLICATIONS

Shishiba, Ryotaro, "Implementation of a Safety Instrumented System," SICE Annual Conference 2007, Sep. 17-20, 2007, Kagawa University, Japan, pp. 2493-2496.
(Continued)

Primary Examiner — Bernard G Lindsay
(74) Attorney, Agent, or Firm — Mintz Levin Cohn Ferris Glovsky and Popeo, PC; Lisa Adams (57) ABSTRACT

A diagnostic system is provided and includes a plurality of processors configured to receive data acquired by a sensor. A first processor can execute a safety function that determines a plurality of sensor measurement from the received data, compares selected sensor measurements to predetermined alarm set points, and determines a safety function output for the selected sensor measurements based upon the sensor measurement comparison. A second processor can determine a shadow function output corresponding to the safety function outputs during different respective portions a diagnostic interval. The shadow function output can be configured to replicate the safety function output under conditions where the safety function output is free from error. A third processor can be configured to validate the safety function output by comparing the safety function output to its corresponding shadow function output and outputting a condition based upon the validation comparison.

18 Claims, 6 Drawing Sheets

(56) References Cited

U.S. PATENT DOCUMENTS

| | | | |
|---|---|---|---|
| 9,378,102 B1 | 6/2016 | Ahmad et al. | |
| 10,338,995 B2 | 7/2019 | Perkins et al. | |
| 2006/0200278 A1* | 9/2006 | Feintuch | G06F 11/1487 |
| | | | 701/3 |
| 2011/0118905 A1* | 5/2011 | Mylaraswamy | G07C 5/085 |
| | | | 701/3 |
| 2012/0221262 A1* | 8/2012 | Nakagawa | B64C 13/503 |
| | | | 702/58 |
| 2012/0233506 A1* | 9/2012 | Kameda | G06F 11/1658 |
| | | | 714/37 |
| 2012/0304017 A1* | 11/2012 | Martin | G06F 11/1612 |
| | | | 714/43 |
| 2013/0245825 A1* | 9/2013 | Vicentini | B25J 9/1674 |
| | | | 700/253 |
| 2018/0329397 A1* | 11/2018 | Izzo | G05B 19/4184 |
| 2020/0409332 A1* | 12/2020 | Kutschbach | G05B 19/39 |

OTHER PUBLICATIONS

"Understanding Safety Integrity Level," Magnetrol International, Incorporated Bulletin: 41-299.4, Jan. 2012, pp. 1-12.

* cited by examiner

FIG. 5 (con't)

SHADOW FUNCTION FOR PROTECTION MONITORING SYSTEMS

CROSS-REFERENCE TO RELATED APPLICATIONS

This application claims the benefit of U.S. Provisional Patent Application No. 62/897,948, filed on Sep. 9, 2019, entitled "Shadow Function For Protection Monitoring Systems," the entirety of which is incorporated by reference.

BACKGROUND

Many industries, such as hydrocarbon refining and power generation, can rely heavily upon operation of machinery, and in some instances, continuous operation of machinery. In these environments, failure of one or more machines can incur significant costs due to repair expenses, as well as loss of production, potential injury to workers, and/or environmental hazard.

Given these risks, it can be common to employ protection monitoring systems to monitor one or more processes performed by a machine. The combination of a machine and corresponding protection monitoring system can be referred to as a safety instrumented system (SIS). The protection monitoring system can measure selected parameters of the monitored process, such as operational parameters of one or more machine components performing the monitored process. Analysis of the measured operating parameters can be further performed to identify faults (e.g., one or more operating parameters that fall outside of predetermined tolerances) that can lead to unacceptable or dangerous conditions. Upon identification of a fault, a corresponding alarm can be annunciated to trigger control of the machine to place the monitored process in a safe state where adverse consequences to worker safety, environmental health, and/or machine damage can be avoided. The various operations performed by hardware and/or software to monitor a process (e.g., parameter measurement, fault detection, alarm issuance, etc.) can be collectively referred to as a safety function for the monitored process.

Standards have been developed to provide a relative evaluation of how well or poorly a given safety function responds when acting in response to an emergency event. Examples of standards include International Electrotechnical Commission (IEC) 61508 and 61511 standards. These standards specify Safety Integrity Levels (SILs) that quantify the relative level of risk reduction provided by a safety function. That is, these standards require identification of potential hazards and demonstration that hardware and/or software does not violate relevant safety goals. Specifically, four discrete SIL ratings are defined, with a SIL rating of 4 representing the highest safety integrity and a SIL rating of 1 representing the lowest safety integrity.

SUMMARY

A safety instrumented system can include 1 to N safety functions, where each safety function is associated with a corresponding process performed by an asset (e.g., a machine). In one embodiment, a safety function can monitor selected operations (e.g., one or more selected operations, up to all operations) performed by hardware and/or software (e.g., measurement and input of sensor data, analysis of the received sensor data, fault detection, alarm annunciation, and machine control subsequent to alarm annunciation). The SIL rating of a safety function can reflect, in part, the risk of undetected errors occurring in the hardware and software performing the safety function. For this reason, each part of the safety function itself can also require a minimum amount of diagnostic coverage to reduce the likelihood of dangerous undetected errors to a level sufficient to achieve a desired SIL rating. That is, respective safety functions can also be monitored to ensure that they function properly.

One existing approach for achieving diagnostic coverage of a safety function can rely upon analysis of every electrical and/or electronic element of an asset, down to the executed lines of code and the bytes of memory, and applying a diagnostic on each element. For simple parts of the safety function, such as the sensor data input, this approach can be practical and achievable. However, for very complex parts of the safety function, there can be many hundreds of thousands of lines of code and bytes of memory that would require a diagnostic. Thus, the cost to implement a diagnostic on every potential point of failure (e.g., every electrical and/or electronic element) can become impractical.

Another existing approach for achieving diagnostic coverage of a safety function is referred to as full redundancy. In full redundancy, the hardware and software performing the safety function in the safety instrumented system is duplicated. The output of the original and duplicate safety functions are determined and compared to ensure that they return the same value(s). Under circumstances where the output of the original and duplicate safety functions are not the same, a fault is detected. However, implementing full redundancy can be impractical from a cost perspective. Notably, full redundancy cuts the available processing power of the safety instrumented system in half, which doubles the cost-per-point for safety functions.

Accordingly, there exists an ongoing need for improved systems and methods for achieving diagnostic coverage of safety functions.

In an embodiment, a diagnostic system is provided and includes a plurality of processors, such as a first processor, a second processor, and a third processor. At least a portion of processors are configured to receive data acquired by a sensor. The first processor can be configured to continuously execute a safety function. The executed safety function can be configured to perform a variety of operations. In one aspect, the operations can include determining one or more sensor measurements representing an operating parameter of a monitored asset from the received data. In another aspect, the operations can include comparing selected ones of the sensor measurements to respective predetermined alarm set points. In a further aspect, the operations can include determining a safety function output for the selected sensor measurements based upon the sensor measurement comparison. The safety function output can represent a first status estimate for the monitored asset. In an additional aspect, the operations can include transmitting the safety function output. The second processor can be configured to perform a variety of operations. The operations can include executing a shadow function configured to determine a shadow function output corresponding to each safety function output during different respective portions of a diagnostic interval. The shadow function output can represent a second status estimate for the monitored asset and it can be is configured to replicate the safety function output under conditions where the safety function output and the shadow function output are free from error. The operations can also include transmitting the shadow function output for each safety function output. The third processor can be different from the first and second processors and it can be configured to perform a variety of operations. The operations can include validating each safety function output by comparing the safety function output with its corresponding shadow function output. The operations can also include outputting a condition for the monitored asset based upon the validation comparison.

In another embodiment, the output condition can be a first condition when the safety function output differs from its corresponding shadow function output by greater than a predetermined fault tolerance. The first condition can represent an error in determining at least one of the first status estimate and the second status estimate.

In another embodiment, the output condition can be a second condition when the safety function output and the shadow function output are approximately equivalent.

In another embodiment, the second condition can indicate no asset fault is detected.

In another embodiment, the second condition can indicate that an asset fault is detected.

In another embodiment, the first processor can be configured to execute a plurality of safety functions. The executed shadow function can be further configured to perform a variety of operations. The operations can include determining a first shadow function output corresponding to a first safety function of the plurality of safety functions only during a first portion of the diagnostic interval. The operations can also include determining a second shadow function output corresponding to a second safety function of the plurality of safety functions only during a second portion of the diagnostic interval. The second portion of the diagnostic interval can follow immediately after the first portion of the diagnostic interval.

In another embodiment, the diagnostic interval can be a maximum time duration permitted to validate each sensor measurement of the safety function by the shadow function.

In another embodiment, the first processor can be configured to execute a first safety function during a first diagnostic interval and a second safety function during a second diagnostic interval. The first safety function can be configured to perform a variety of operations. The operations can include determining one or more first sensor measurements from the received data. The operations can also include comparing selected ones of the first sensor measurements to respective predetermined alarm set points. The operations can also include determining a safety function output for the selected first sensor measurements based upon the first sensor measurement comparison. The second safety function can be configured to perform a variety of operations. The operations can include determining one or more second sensor measurements from the received data. The operations can also include comparing selected ones of the second sensor measurements to respective predetermined alarm set points. The operations can further include determining a safety function output for the selected second sensor measurements based upon the second sensor measurement comparison.

In another embodiment, the shadow function is further configured to determine first shadow function outputs corresponding to the selected first sensor measurements during different respective portions of a first diagnostic interval. The shadow function can also determine second shadow function outputs corresponding to the selected second sensor measurements during different respective portions of a second diagnostic interval immediately following the first diagnostic interval. The first and second shadow function outputs can be determined approximately concurrently.

In an embodiment, a diagnostic method is provided. The method can include receiving, by selected ones of a plurality of plurality of processors, data acquired by a sensor. The method can also include executing, by a first processor of the plurality of processors, a safety function. The executed safety function can be configured to perform a variety of operations. In one aspect, the operations can include determining one or more sensor measurements representing an operating parameter of a monitored asset from the received data. In another aspect, the operations can include comparing selected ones of the sensor measurements to respective predetermined alarm set points. In a further aspect, the operations can include determining a safety function output for the selected sensor measurements based upon the sensor measurement comparison. The safety function output can represent a first status estimate for the monitored asset. In an additional aspect, the operations can include transmitting the safety function output. The second processor can be configured to perform a variety of operations. The operations can include executing a shadow function configured to determine a shadow function output corresponding to each safety function output during different respective portions of a diagnostic interval. The shadow function output can represent a second status estimate for the monitored asset and it can be is configured to replicate the safety function output under conditions where the safety function output and the shadow function output are free from error. The operations can also include transmitting the shadow function output for each safety function output. The third processor can be different from the first and second processors and it can be configured to perform a variety of operations. The operations can include validating each safety function output by comparing the safety function output with its corresponding shadow function output. The operations can also include outputting a condition for the monitored asset based upon the validation comparison.

In another embodiment, the output condition can be a first condition when the safety function output differs from its corresponding shadow function output by greater than a predetermined fault tolerance. The first condition can represent an error in determining at least one of the first status estimate and the second status estimate.

In another embodiment, the output condition can be a second condition when the safety function output and the shadow function output are approximately equivalent.

In another embodiment, the second condition can indicate no asset fault is detected.

In another embodiment, the second condition can indicate that an asset fault is detected.

In another embodiment, a plurality of safety functions can be executed by the first processor. The executed shadow function can be configured to perform a variety of operations. The operations can include determining a first shadow function output corresponding to a first safety function of the plurality of safety functions only during a first portion of the diagnostic interval, The operations can also include determining a second shadow function output corresponding to a second safety function of the plurality of safety functions only during a second portion of the diagnostic interval. The second portion of the diagnostic interval can follow immediately after the first portion of the diagnostic interval.

In another embodiment, the diagnostic interval can be a maximum time duration permitted to validate each sensor measurement of the safety function by the shadow function.

In another embodiment, a first safety function can be executed by the first processor during a first diagnostic interval and a second safety function can be executed by the first processor during a second diagnostic interval. The first safety function can be configured to perform a variety of operations. The operations can include determining one or more first sensor measurements from the received data. The operations can also include comparing selected ones of the first sensor measurements to respective predetermined alarm set points. The operations can also include determining a safety function output for the selected first sensor measurements based upon the first sensor measurement comparison. The second safety function can be configured to perform a variety of operations. The operations can include determining one or more second sensor measurements from the received data. The operations can also include comparing selected ones of the second sensor measurements to respective predetermined alarm set points. The operations can further include determining a safety function output for the selected second sensor measurements based upon the second sensor measurement comparison.

In another embodiment, the shadow function is further configured to determine first shadow function outputs corresponding to the selected first sensor measurements during different respective portions of a first diagnostic interval. The shadow function can also determine second shadow function outputs corresponding to the selected second sensor measurements during different respective portions of a second diagnostic interval immediately following the first diagnostic interval. The first and second shadow function outputs can be determined approximately concurrently.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Complex systems can potentially have points of failure that can require diagnostic monitoring to ensure proper operation. Diagnostic monitoring can include acquiring a measurement of an operating parameter of an asset (e.g., a single machine, a component of a machine, a machine system including two or more machines, etc.), comparing the operating parameter to a range of acceptable values, and triggering an alarm if the operating parameter is outside of the acceptable range, referred to as a safety function. To reduce the likelihood that an alarm is triggered due to an error in the safety function, rather than an actual error in the operation of the system, that is a false positive, it is common to redundantly perform each safety function, referred to as full redundancy. In this approach, an alarm is triggered only when a discrepancy between the results of multiple safety functions. However, the cost to implement full redundancy can be cost-prohibitive because it requires significantly more computing resources. Additionally, safety issues still remain, despite the use of existing diagnostic monitoring systems, due to finite likelihood of missing real errors (e.g., false negatives) that should otherwise cause an alarm to be triggered. Accordingly, improved diagnostic monitoring systems and methods are provided which address this deficiency. A shadow function diagnostic is employed as an alternative to full redundancy. The shadow function is employed to replicate the output of a safety function during limited time windows, rather than continuously. This reduces the computing resources and attendant cost needed to diagnostically monitor safety functions.

Embodiments of safety instrumented systems and corresponding methods for diagnostic coverage of a safety function using a shadow function are discussed herein. Embodiments of the shadow function and safety function are discussed in the context of safety instrumented functions of a turbomachine (e.g., a gas turbine system). However, embodiments of the disclosure can be employed in combination with any safety instrumented functions without limit.

Figure 1:
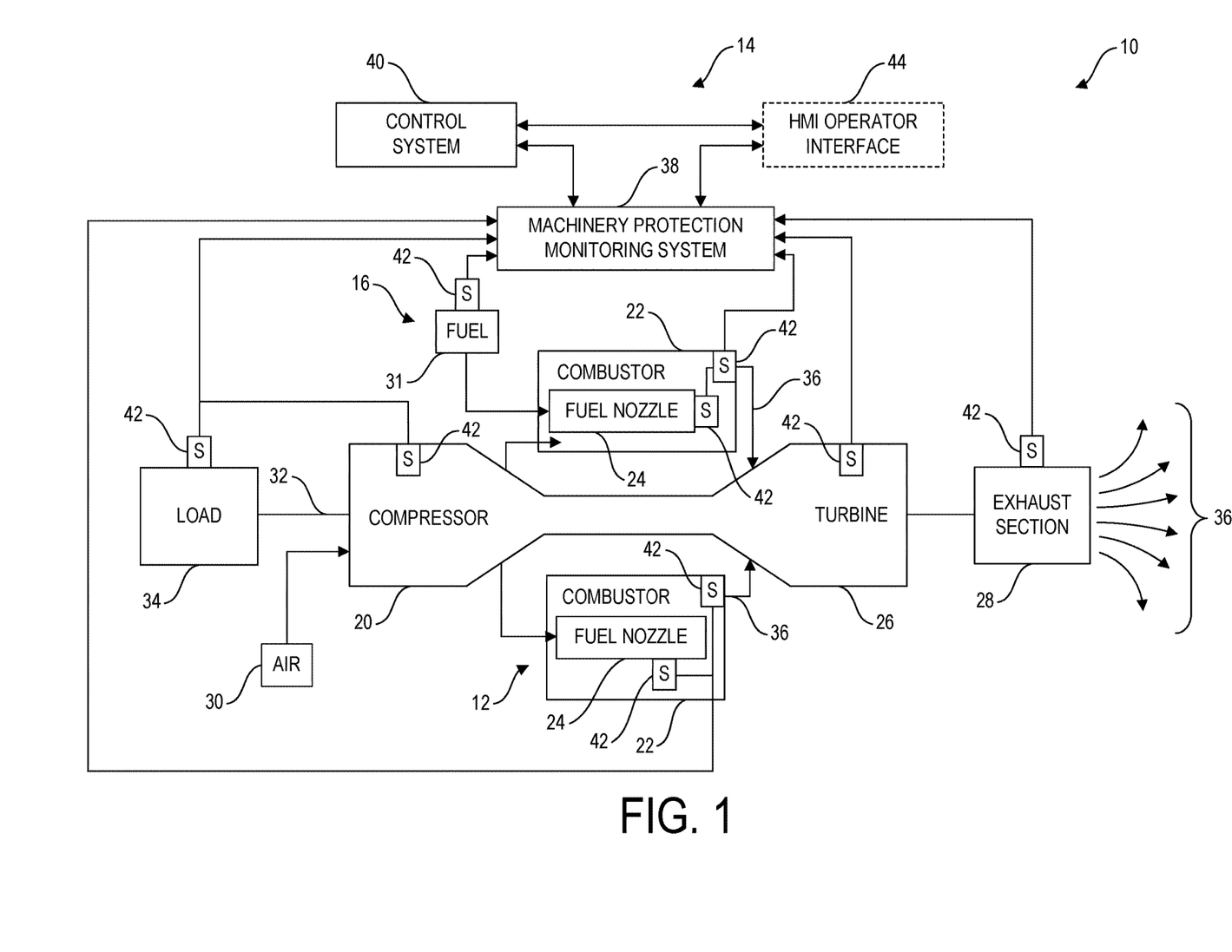
FIG. 1 is a block diagram illustrating one exemplary embodiment of an operating environment including a safety instrumented system (SIS)

To facilitate understanding of the shadow function, an operating environment including an embodiment of a safety instrumented system in the form of an industrial system 10 is illustrated in FIG. 1. As shown, the industrial system 10 can include a monitored machine or machine system 12 (e.g., a gas turbine system 12), a monitoring and control system 14, and a fuel supply system 16. The gas turbine system 12 may include a compressor 20, combustion systems 22, fuel nozzles 24, a turbine 26, and an exhaust section 28. During operation, the gas turbine system 12 may pull air 30 into the compressor 20, which may then compress the air 30 and move the air 30 to the combustion systems 22 (e.g., which may include a number of combustors). In the combustion systems 22, the fuel nozzle 24 (or a number of fuel nozzles 24) may inject fuel that mixes with the compressed air 30 to create, for example, an air-fuel mixture.

The air-fuel mixture may combust in the combustion systems 22 to generate hot combustion gases, which flow downstream into the turbine 26 to drive one or more turbine 26 stages. For example, the combustion gases move through the turbine 26 to drive one or more stages of turbine 26 blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gases 36 may include gases such as carbon dioxide ($CO_2$), carbon monoxide (CO), nitrogen oxides ($NO_x$), and so forth.

It can be appreciated that the industrial system 10 can adopt other forms, without limit. Examples can include steam turbine systems, a hydraulic turbine systems, one or more compressor systems (e.g., aeroderivative compressors, reciprocating compressors, centrifugal compressors, axial compressors, screw compressors, and so forth), one or more electric motor systems. Other industrial systems can also include fans, extruders, blowers, centrifugal pumps, or any of various other industrial machinery that may be included in an industrial plant or other industrial facility. As will be further appreciated, the techniques discussed herein may be used to monitor and protect any of the aforementioned industrial machinery, or any combination of the industrial machinery.

In certain embodiments, the industrial system 10 can also include a protection monitoring system 38, a control system 40, one or more sensors 42, and a human machine interface (HMI) operator interface 44. The protection monitoring system 38 can receive data from the sensors 42. The protection monitoring system 38 can energize one or more relay contacts 58, 60, 62 based on the sensor data to generate an alarm signal indicative of, for example, operational condition of the fuel supply system 16, the compressor 20, the turbine 26, the combustion systems 22, the exhaust section 28, or other components of the industrial system 10, alone or in combination.

In certain embodiments, the HMI operator interface 44 may be executable by one or more computer systems (although not illustrated), which may be used by a plant operator to interface with the industrial system 10 via an HMI operator interface 44. Accordingly, the HMI operator interface 44 may include various input and output devices (e.g., mouse, keyboard, monitor, touch screen, or other suitable input and/or output device) such that a plant operator may provide commands (e.g., control and/or operational commands) to the protection monitoring system 38 or the control system 40 and to receive operational information from the protection monitoring system 38, the control system 40, or directly from the sensors 42. Similarly, the control system 40 may be responsible for controlling one or more final control elements coupled to the components (e.g., the compressor 20, the turbine 26, the combustors of combustion systems 22, the load 34, and so forth) of the industrial system 10 such as, for example, one or more actuators, valves, transducers, and so forth.

In certain embodiments, the sensors 42 can be any of various sensors useful in acquiring operational data regarding one or more components of the industrial system 10 and transmitting the operational data to the protection monitoring system 38. Examples of the operational data can include pressure and temperature of the compressor 20, speed and temperature of the turbine 26, vibration of the compressor 20 and the turbine 26, $CO_2$ levels in the exhaust gases 36, carbon content in the fuel 31, temperature of the fuel 31, temperature, pressure, clearance of the compressor 20 and the turbine 26 (e.g., distance between the compressor 20 and the turbine 26 and/or between other stationary and/or rotating components that may be included within the industrial system 10), flame temperature or intensity, vibration, combustion dynamics (e.g., fluctuations in pressure, flame intensity, and so forth), load data from load 34, and so forth.

Figure 2:
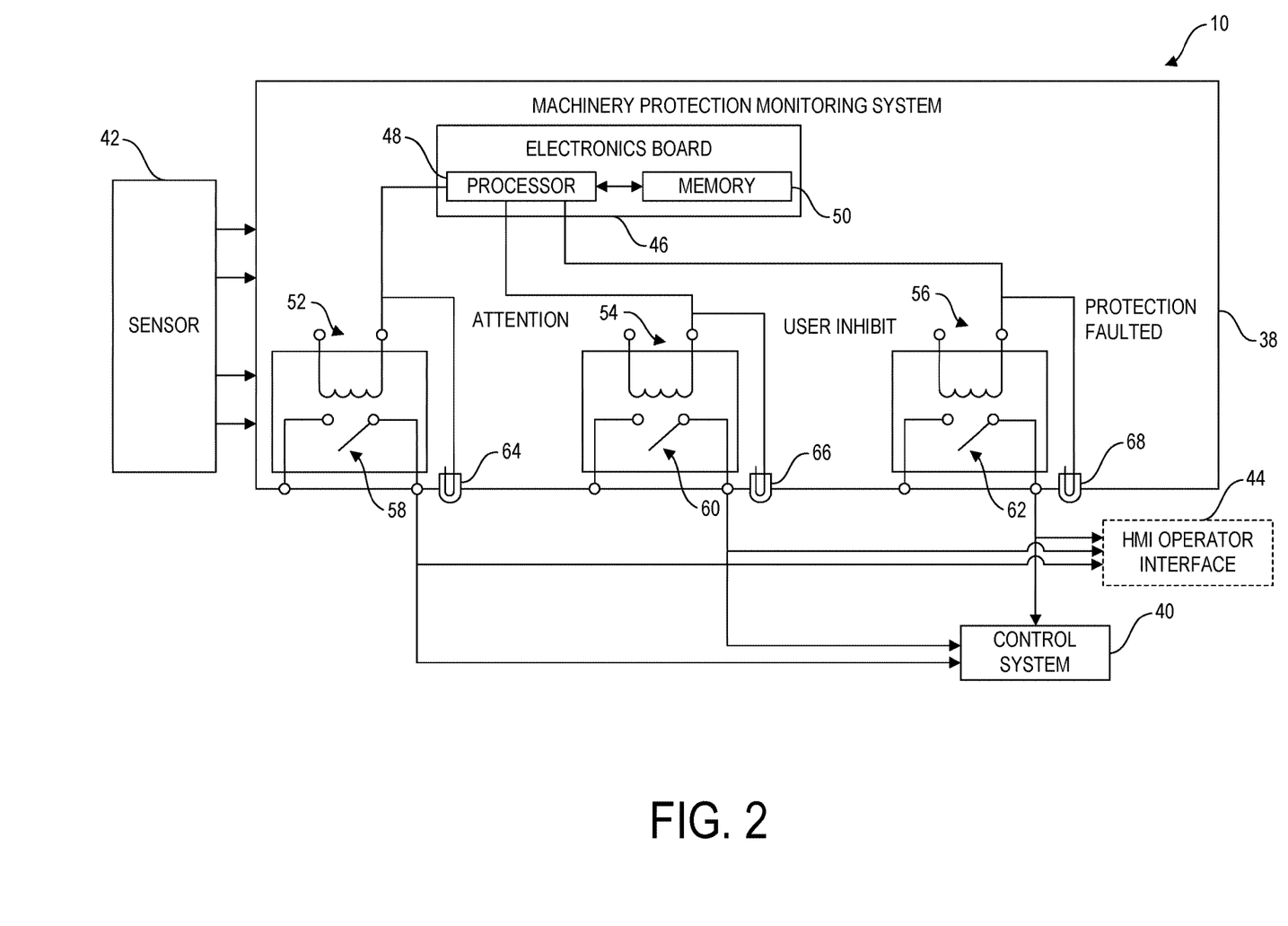
FIG. 2 is a block diagram illustrating one exemplary embodiment of a protection monitoring system including a diagnostic system.

FIG. 2 illustrates an exemplary embodiment of the protection monitoring system 38. As generally discussed above, the protection monitoring system 38 can include any device useful in providing continuous, online monitoring and protection of the compressor 20, the turbine 26, the combustors of combustion systems 22, or other components of the industrial system 10. In one embodiment, the protection monitoring system 38 may be enclosed inside, for example, a finished cabinet, such that the protection monitoring system 38 may be panel mounted (e.g., near the compressor 20, the turbine 26, or other machinery that may be monitored by the protection monitoring system 38) or retrofitted as a standalone and/or integrated system.

The protection monitoring system 38 can include an electronic board 46. The electronic board 46 can further include one or more processors 48 that are operatively coupled to a memory 50 to execute instructions for carrying out one or more safety functions. In general, a safety function can determine a plurality of sensor measurement (e.g., position, speed, acceleration, vibrational amplitude, etc.) from raw data received from the sensors 42 (e.g., voltage, current, etc.) As an example, the processor 48 can receive the sensor data 42s (e.g., pressure and temperature of the compressor 20, speed and temperature of the turbine 26, vibration of the compressor 20 and the turbine 26, $CO_2$ levels in the exhaust gases 36, carbon content in the fuel 31, temperature of the fuel 31, temperature, pressure, clearance of the compressor 20 and the turbine 26, flame temperature or intensity, vibration, and combustion dynamics of the combustion systems 22, load data from load 34, and so forth).

The safety function can be further configured to compare each sensor measurement to a predetermined alarm set point. As an example, the electronic board 46 of the protection monitoring system 38 may include a number of respective monitors for monitoring respective operating inputs and/or outputs. The respective monitors may each occupy respective slots in a rack of the protection monitoring system 38. The processor 48 may provide user-adjustable alarm set points for each of a number of input and/or output channels of the protection monitoring system 38.

In certain embodiments, the protection monitoring system 38 may be programmed or configurable (e.g., performed via the processor 48 and the memory 50) to be responsive to a number of detected operating conditions of the industrial system 10. A safety function can be implemented for each sensor measurement and provide an output based upon a comparison of the sensor measurement(s) and one or more predetermined set points. In one embodiment, the output can be a status determined by programmed logic. However, in other embodiments, discussed in greater detail below, the output can be a numerical value.

Under circumstances where the one or more sensor measurements of the safety function fall outside of the predetermined alarm set points, it can be desirable for the safety function output to annunciate detection of a fault or other adverse operating condition of one or more components (e.g., the compressor 20, the turbine 26, the combustors of combustion systems 22, the load 34, and so forth) of the industrial system 10. With annunciation of a fault, the industrial system 10 can be placed in a safe state where adverse consequences to worker safety, environmental health, and/or machine damage can be avoided. As an example, the safety function can generate and transmit alarm signals to one or more relays 52, 54, and 56. The alarm signals may also be passed to one or more front panel indicators 64, 66, and 68 (e.g., light-emitting diodes (LEDs)), facilitating, for example, plant operator or technician observation. Based on these outputs, the control system 40 may provide outputs to transducers or other final control elements (e.g., valves, actuators, etc.).

However, if a fault is erroneously identified (e.g., due to errors in one or more of hardware and/or software performing the safety function) or an accident occurs because a fault is not identified, undesirable delays and associated costs can be incurred, as well as harm to workers, environmental health and/or machine damage. Accordingly, embodiments of the protection monitoring system 38 can also include a shadow function diagnostic. The shadow function diagnostic can receive the same data from the sensors 42 as the safety function and determine a shadow function output corresponding to each safety function output. That is, the shadow function diagnostic can determine a shadow function output for each measurement of the safety function. This process of determining a shadow function output for a safety function can be referred to herein as shadowing.

As an example, the output of each of the shadow function and the safety function can be an estimated status of the monitored asset (e.g., sensors, instrumentation, machines, etc.) In one embodiment, the asset status can be a "fault present" status, representing detection of one or more predetermined deviations from normal operation that constitute an asset fault. In another embodiment, the asset status can be "no fault present," representing no detection of deviations from normal operation that constitute an asset fault. As discussed below, recognizing that respective asset status estimates determined by the safety function and the shadow function are merely provisional and unconfirmed when considered independently from one another, the safety function output and corresponding shadow function output can be compared to one another in order to verify whether or not the status estimates are correct.

When the asset status estimates represented by the shadow function output and the safety function output agree with one another (e.g., are approximately equivalent or equal within a predetermined tolerance), this result can indicate that the asset status estimates are correct.

After an asset fault status is determined to be correct, the asset fault status can be annunciated (e.g., via HMI operator interface 44 or other mechanism (e.g., front panel indicators 64, 66, 68). For example, a first annunciation can represent the "asset fault present" status, while a second annunciation can represent the "no asset fault" status.

When the asset fault status represented by the shadow function output and safety function output are different and do not agree with one another, this result can indicate that at least one of the safety function output or the shadow function output is incorrect. That is, one of the safety function or the shadow function is not operating correctly, constituting a "diagnostic fault" status. Accordingly, under this circumstances, an alarm can be annunciated in a third annunciation, different from the first and second annunciations, to communicate detection of the diagnostic fault status.

It can be understood that, when the diagnostic fault condition is detected, the industrial system 10 can be unprotected because it is not clear whether an asset fault is present or not. Therefore, to be conservative, annunciation of either the "asset fault present" status the "diagnostic fault" status can trigger control of the industrial system 10 to adopt the safe state.

As further discussed below, in contrast with existing diagnostics, the shadow function diagnostic does not determine a shadow function output continuously for each safety function measurement. Instead, the shadow function is time-division multiplexed across all safety function measurements. As an example, during a first time period, a first safety function measurement is shadowed, during a second time period immediately following the first time period, a second safety function measurement is shadowed, etc. Shadowing is continued in succession by the shadow function until all safety function measurements have been shadowed. In general, a maximum diagnostic interval can be specified to shadow a given safety function or set of two or more safety functions. In other words, the maximum diagnostic interval specifies the maximum amount of time for the shadow function to shadow each safety function. However, under circumstances where the shadow function can shadow each safety function in less time than the maximum diagnostic interval, the shadow function can repeat shadowing of one or more safety functions, provided that the maximum diagnostic interval is not exceeded.

Figure 3:
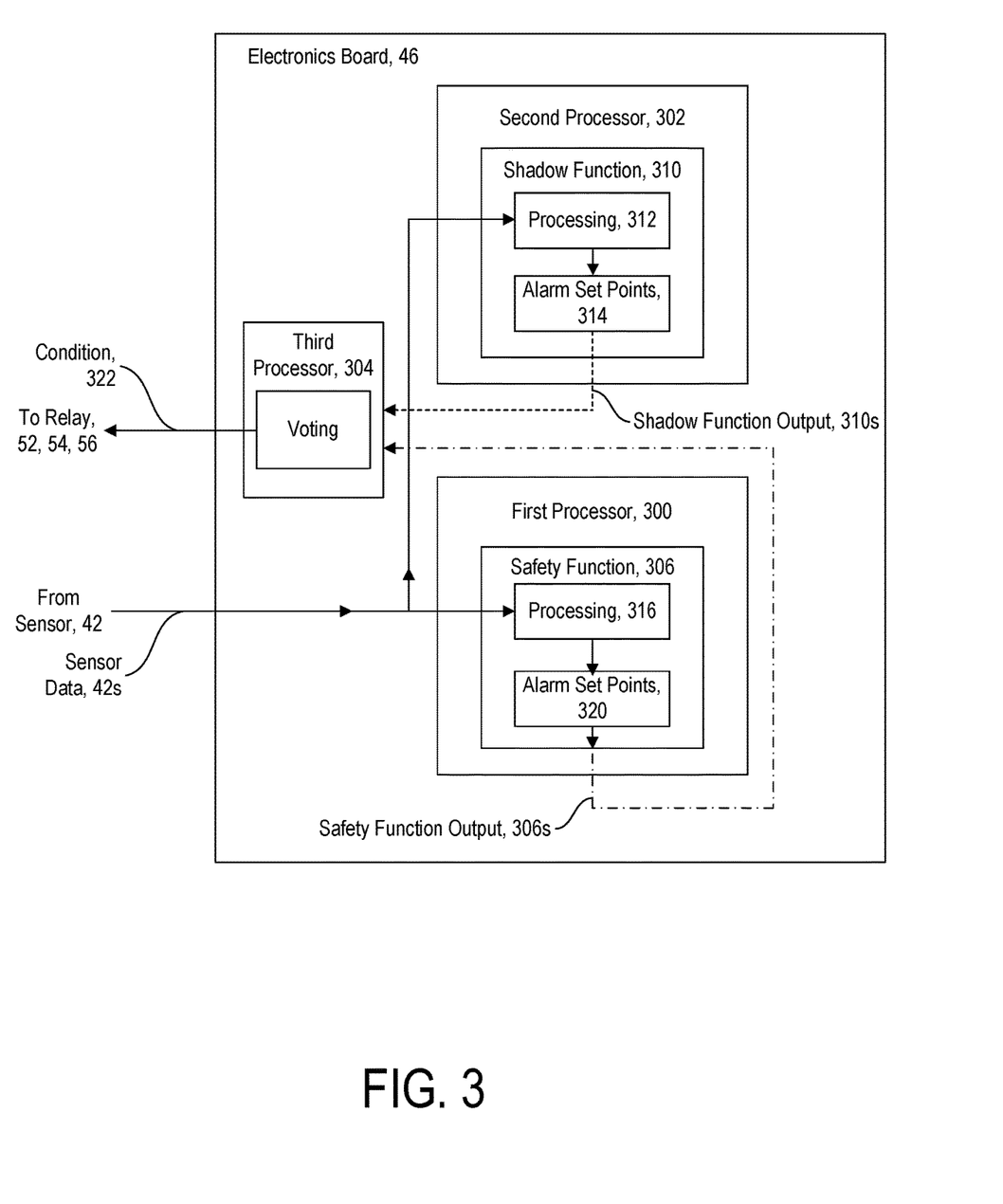
FIG. 3 is a block diagram illustrating one exemplary embodiment of the diagnostic system of FIG. 2 configured to perform a safety function and a shadow function.

FIG. 3 illustrates an embodiment of the electronic board 46 including a first processor 300, a second processor 302, and a third processor 304. As discussed in detail below, the first processor 300 is configured to execute one or more safety functions 306 and transmit a safety function output 306s. Similarly, the second processor 302 is configured to execute one or more shadow functions 310 and transmit a shadow function output 310s corresponding to a respective safety functions 306. The third processor 304 is configured to receive the safety function output 306s and the shadow function output 310s as inputs and validate or verify the safety function output 306s by a comparison between the two. The third processor 304 can be further configured to determine a condition 322 based upon this validation comparison.

As shown, sensor data 42s is received by the electronic board 46 from the sensors 42 and directed to the first processor 300 and the second processor 302. In certain embodiments, the sensor data 42s can be raw sensor data output by the sensors 42, such as voltage or current. In certain embodiments, not shown, the sensor data 42s can optionally be pre-processed prior to transmission to the first processor 300 and the second processor 302. As an example, pre-processing can include decimation of raw sample rate.

The first processor 300 can be configured to convert the sensor data 42s to a measurement. The measurement(s) can be compared (e.g., processing 312) with corresponding alarm set point 314. Subsequently, the safety function output 306s (e.g., a first estimate of the asset status) can be generated and transmitted to the third processor 304.

The second processor 302 can be configured to convert the sensor data 42s to a measurement. The measurements can be compared (e.g., processing 316) with corresponding alarm set points 320. Subsequently, the safety function output 306s (e.g., a second estimate of the asset status) can be generated and transmitted to the third processor 304.

The third processor 304 can be configured to compare the received shadow function output 310s to the safety function output 306s, to determine a condition based upon the comparison, and to transmit the determined condition to one or more of the relays 52, 54, 56. In certain embodiments, the relays 52, 54, 56 can correspond to different predetermined conditions (e.g., "fault present," "no fault present," "diagnostic fault," respectively). Thus, when one of the relays 52, 54, 56 receives its corresponding condition, the relay contact (e.g., 58, 60, 62, respectively) can actuate and transmit a condition signal representing the determined condition for annunciation (e.g., to HMI operator interface 44 and/or another annunciation mechanism such as front panel indicators 64, 66, 68).

Under circumstances where the shadow function output 310s and the safety function output 306s are equivalent, the condition determined by the third processor 304 can be designated as correct. Receipt of the "fault present" condition by the corresponding relay (e.g., relay 52) can trigger actuation of its relay contact (e.g., relay contact 58) and this condition can be annunciated by the HMI operator interface 44 and/or a corresponding front panel indicator (e.g., front panel indicator 64). Receipt of the "no fault present" condition by the corresponding relay (e.g., relay 54) can trigger actuation of its relay contact (e.g., relay contact 60) and this condition can be annunciated by the HMI operator interface 44 and/or a corresponding front panel indicator (e.g., front panel indicator 66). In alternative embodiments, annunciation of the "no asset fault" condition can be omitted, as this condition represents normal operation.

Under circumstances where the shadow function output 310s and the safety function output 306s are not equivalent, the condition determined by the third processor 304 can be designated as a "diagnostic fault" condition. Receipt of the "diagnostic fault" condition by the corresponding relay (e.g., relay 56) can trigger actuation of its relay contact (e.g., relay contact 62) and this condition can be annunciated by the HMI operator interface 44 and/or a corresponding front panel indicator (e.g., front panel indicator 68).

Under circumstances where either the "fault present" condition or the "diagnostic fault" condition are determined, actuation of the corresponding relay contacts (e.g. relay contacts 58, 62, respectively), commands to the control system 40 (e.g., control and/or operational commands) that are operative to suspend normal operation of the industrial system 10 and place the operations of the selected components of the gas turbine system 12 corresponding to the asset fault condition or diagnostic fault condition in a safe state. In alternative embodiments, annunciation of any fault can be suppressed by an operator (e.g., via the HMI operator interface 44), at their discretion, to permit normal operation of the industrial system 10 to continue.

In general, the shadow function 310 is configured to perform a black box style of diagnostic. That is, when shadowing a given measurement of the safety function 306, for the same input as the safety function 306, the shadow function output 310s is configured replicate the safety function output 306s, assuming no errors are present in the hardware and/or software used to generate the safety function output 306s (e.g., the first processor 300 and software executed thereby) and the shadow function output 310s (e.g., the second processor 302 and software executed thereby).

The algorithms performed by the shadow function 310 to determine the shadow function output 310s can be different than those employed by the safety function 306 to determine the safety function output 306s. Beneficially, under circumstances where there is an error in hardware and/or software executing algorithms to determine the safety function output 306s, replication of such an error can be avoided by the shadow function 310 when determining the shadow function output 310s. Likewise, under circumstances where there is an error in the hardware and/or software executing algorithms to determine the safety function output 306s, replication of such an error can be avoided by the safety function 310 when determining the shadow function status 306s. This can also be referred to as disparate processing.

A difference between the implementation of the shadow function 310 and simple redundancy is that there is a single shadow function 310, or a two or more shadow functions 310, and that the shadow function(s) 310 time-division multiplex their processing and alarm diagnostics across all safety functions 306 and safety function measurements (e.g., acquisition and transmission of sensor data 42s).

Figure 4:
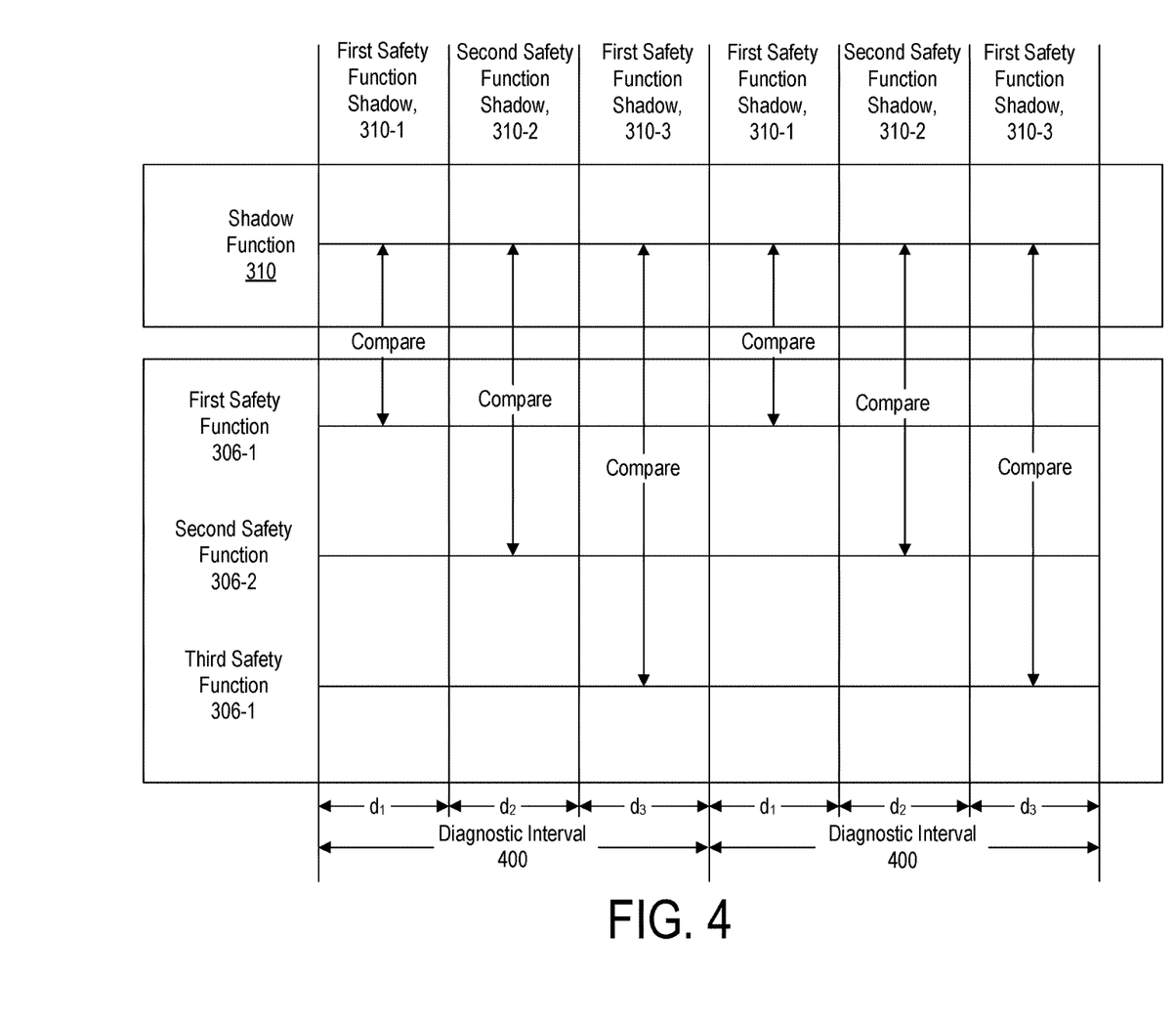
FIG. 4 is a diagram illustrating time division multiplexed redundancy of the shadow function of FIG. 3.

As shown in FIG. 4, three independent safety functions, first safety function 306-1, second safety function 306-2, and third safety function 306-3 are shadowed by a respective portions of a single shadow function, first safety function shadow 310-1, second safety function shadow 310-2, third safety function shadow 310-3. In alternative embodiments, not shown, three independent shadow functions can be performed for a single safety function. During each shadowing phase, respective safety function shadows 310-1, 310-2, 310-3 are given the same inputs as the one of the safety function shadows 306-1, 306-2, 306-3 that it is shadowing (e.g., the first safety function shadow 310-1 shadows the first safety function 306-1, the second safety function shadow 310-2 shadows the second safety function 306-2, the third safety function shadow 310-3 shadows the third safety function 306-3). The respective safety function shadows 310-1, 310-2, 310-3 can shadow their corresponding safety function 306-1, 306-2, 306-3 for an amount of time that is sufficient to determine whether the outputs of the safety function shadows 310-1, 310-2, 310-2 transmitted by the second processor 302 are identical to the corresponding outputs of safety function 306-1, 306-2, 306-3 transmitted by the first processor 300.

In certain embodiments, the output of the shadow function 310 and the safety function 306 can be a numerical value, rather than a status. As an example, the safety function output 306s and shadow function output 310s can be an operational parameter measurement, rather than a status resulting from comparison of the operational parameter measurement with the corresponding alarm set points 314, 320. Accordingly, the shadow function output 310s and the safety function output 306s in this context can be considered to be identical when the respective numerical values are within a predetermined tolerance of one another. For given processors and/or cores, the accuracy of a given output (e.g., decimal point precision) can vary. Accordingly, the predetermined tolerance can be assigned with such differences in mind.

As further shown in FIG. 4, a minimum supported diagnostic interval 400 for the shadow function 310 is the amount of time required for the shadow function 310 to shadow every safety function 306 (e.g., every safety function measurement of every safety function 306). This can influence potential deployments in high demand systems that require a very short diagnostic interval. As discussed above, in the context of FIG. 4, the safety functions 306 are the first safety function 306-1, the second safety function 306-2, and the third safety function 306-3. The first safety function 306-1 is monitored by the first safety function shadow 310-1 during a first portion $d_1$ of the diagnostic interval 400. The second safety function 306-2 is monitored by the second safety function shadow 310-2 during a second portion $d_2$ of the diagnostic interval 400. The third safety function 306-3 is monitored by the third safety function shadow 310-3 during a third portion $d_3$ of the diagnostic interval 400. In further embodiments, in order to improve the diagnostic interval, multiple shadow functions can be executed in parallel, each shadowing a different safety function.

Because each safety function 306 is only shadowed by the shadow function 310 during a portion of the diagnostic interval 400, there is a possibility of transitory failure causing an error during a time when respective ones of the safety function 306 is not shadowed and then the error disappears when the shadow function 310 subsequently shadows the respective safety functions 306 again. In order to handle this aspect of safety certification, it can be desirable to employ temporal redundancy to provide resistance to single faults. As an example, the first processor 300 and the second processor 302 can be configured to require that the "fault present" status is identified multiple times by the safety function 306 or the shadow function 310, respectively, before such a fault status is transmitted to the third processor 304 for verification.

In certain embodiments, the first processor and the second processor can be the same. As an example, the safety function and the shadow function can be executed on the same core of a single processor.

In one alternative embodiment, the safety function 306 and the shadow function 310 can be executed on different cores (of the same core architecture or different core architectures) on the same multi-core processor. Beneficially, under circumstances where there is an error in determination of the safety function output 306s due to errors in the processor core, repetition of such an error can be avoided by the shadow function 310 when determining the shadow function output 310s.

Common cause failures can be reduced by executing the safety function 306 and the shadow function 310 on different cores of the same processor, as compared to such execution on the exact same core. However, it can be appreciated that such an approach can miss certain common cause failures. Examples of common cause failures can include, but are not limited to, a common power supply, cache, or other memory shared by multiple cores, etc. Accordingly, in a further embodiment, the safety function and the shadow function can be executed on different cores of different multi-core processors. In one aspect, the first and second processors can be physically different but of the same architecture (single core) or core architecture (multi-core). In another aspect, the first and second processors can be physically different with different architecture (single core) or core architecture (multi-core) architectures. Since the cores of the first and second processors are physically and/or architecturally different, the number of common cause failures related to hardware can be significantly reduced. This further results in a decrease of the work needed for diagnostics on common cause failures. Accordingly, this approach has the additional cost benefit of allowing the second processor implementing the shadow function to be smaller and cheaper as compared to the first processor implementing the safety function.

In a further embodiment, the shadow function can be implemented on a different core of a different type than the safety function. The core implementing the shadow function can have a much higher reliability than can be found on many SIL certifiable processor architectures. Such cores can have built-in diagnostic coverage, failure tolerance, and additional measures to ensure that the diagnostic coverage on the safety function measurements is maximized.

This concept can be thought of as the Golden Rule idea, where the shadow function has a very high degree of confidence in accuracy and can be used in such a fashion. Ordinarily, when comparing the output of two redundant functions, the only thing that can be determined is whether a fault is present. It is unknown if the fault is in the safety function 306 or the shadow function 310 itself. In contrast, in embodiments where the shadow function 310 is implemented on a high reliability processor, the statistical likelihood that the shadow function 310 is the cause of error is relatively low. Furthermore, there are certain behaviors that can be done to improve availability, such as having the shadow function 310 temporarily take over implementation of a safety function 306 exhibiting error while that safety function 310 is being corrected.

Building from the high-reliability concept of the shadow function 310 discussed above, even though the statistical likelihood of the Golden Rule shadow function exhibiting failure is low, it is still non-negligible. To further reduce this likelihood, the shadow function 310 can be redundantly implemented on even higher reliability processor architecture, such as lock-step cores. Employing such an approach, the statistical likelihood of the shadow function 310 exhibiting a failure is approaching negligible. This improves availability that the shadow function 310 can then be used to take over the safety function 306 temporarily while the original safety function is repaired.

Figure 5:
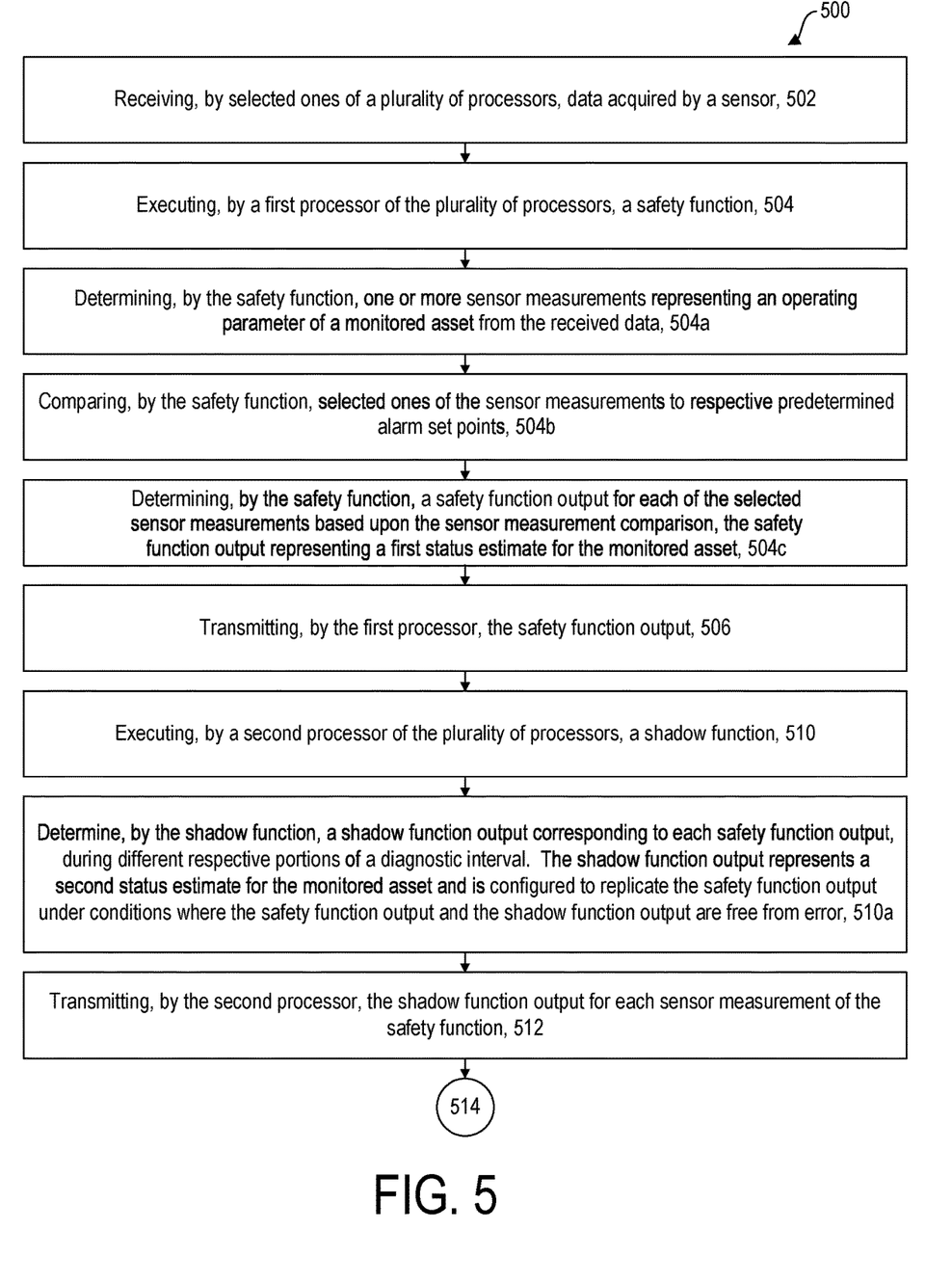
FIG. 5 is a flow diagram illustrating one exemplary embodiment of a method of diagnostic monitoring of a safety function.

An exemplary embodiment of a diagnostic method 500 employing the protection monitoring system 38 (e.g., the electronic board 46) is illustrated in FIG. 5. As shown, the method 500 includes operations 502-520. It can be understood, however, that alternative embodiments of the method can include greater or fewer operations and the operations of the method can be performed in an order different than that illustrated in FIG. 5, as necessary.

In operation 502, sensor data 42s acquired by the sensors 42 can be received by selected ones of a plurality of processors. As an example, the plurality of processors can include the first processor 300, the second processor 302, and the third processor 304. The sensor data 42s can be received by the first processor 300 and the second processor 302.

In operation 504, the first processor 300 can execute the safety function 306. The safety function 306 can be configured to perform a variety of operations. As an example, in operation 504a, the safety function 306 can be configured to determine one or more sensor measurements representing an operating parameter of a monitored asset from the sensor data 42s. In operation 504b, the safety function 306 can be further configured to compare selected ones of the sensor measurements to respective predetermined alarm set points. In operation 504c, the safety function 306 can also be configured to determine the safety function output 306s for of the selected sensor measurements. The safety function output 306s can represent a first status estimate for the monitored asset.

In operation 506, the first processor 300 can transmit the safety function output 306s. As discussed below, the safety function output 306s can be received by the third processor 304 for processing.

In operation 510, the second processor 302 can execute the shadow function 310. The shadow function 310 can be configured to perform a variety of operations. As an example, the operations can include operation 510a, where the shadow function 310 determines a shadow function output 310s corresponding to each safety function output 306s during different respective portions of the diagnostic interval 400. The shadow function output 310s can represent a second status estimate for the monitored asset and it can also be configured to replicate the safety function output 306s under conditions where the safety function output 306s and the shadow function output 310s are free from error.

In operation 512, the second processor 302 can transmit the shadow function output 310s. As discussed below, the shadow function output 310s can be received by the third processor 304 for processing.

In operation 514, the third processor 304 can receive the safety function output 306s and the shadow function output 310s. The third processor 304 can be different from the first processor 300 and the second processor 302.

In operation 516, the third processor 304 can validate each safety function output 306s. As an example, the third processor 304 can compare the safety function output 306s with its corresponding shadow function output 310s.

In operation 520, the third processor 304 can output the condition 322 determined from the comparison performed in operation 516. The condition 322 can be received by one or more of the relays 52, 54, 56. As discussed above, receipt of the condition 322 by a respective relay 52, 54, 56 can trigger actuation of its corresponding relay contact (e.g., 58, 60, 62, respectively) to transmit an corresponding condition signal to the HMI operator interface 44 for annunciation.

Under circumstances where the status represented by the safety function output 306s and the shadow function output 310s agree (e.g., are equivalent), the third processor 304 can output that status as the condition 322. As discussed above, in an embodiment, the safety function output 306s and the shadow function output 310s can be one of "asset fault present" or "no asset fault." Alternatively, under circumstances where the status represented by the safety function output 306s and the shadow function output 310s are not in agreement (e.g., are not equivalent), neither status is output by the third processor 306. Instead, a "diagnostic fault" is output as the condition 322.

In further embodiments, when the condition 322 output by the third processor 306 is either the "asset fault present" condition or the "diagnostic fault" condition, one or more of the relays 52, 54, 56 can be triggered (e.g., via actuation of respective relay contacts 58, 60, 62) to cause commands (e.g., control and/or operational commands) to be sent to the control system 40. Such commands can be operative to suspend normal operation of the industrial system 10 and cause the components of the gas turbine system 12 that correspond to the asset fault condition or diagnostic fault to operate in a predetermined safe state. In further embodiments, annunciation of an instrumentation fault can be optionally suppressed by an operator (e.g., via the HMI operator interface 44) at their discretion to continue normal operation of the industrial system 10.

Exemplary technical effects of the methods, systems, and devices described herein include, by way of non-limiting example systems and methods for providing diagnostic coverage of safety functions utilizing a shadow function. A safety instrumented system including the shadow function can provide SIL certification without employing full redundancy, reducing the cost per point for safety function diagnostics. Commercially available high-reliability platforms can be used without the need to process all safety functions simultaneously. A Golden Rule concept can be implemented, where if a difference between safety function output and shadow function output occurs, there is a high degree of confidence that the failure is in the safety function, rather than the shadow function. The Golden Rule can be improved with shadow function redundancy, improving availability.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A diagnostic system, comprising:
a plurality of processors, wherein at least a portion of the processors are configured to receive data acquired by a sensor, the plurality of processors including,
a first processor configured to,
continuously execute a plurality of safety functions, wherein the executed safety functions are configured to perform operations including,
determining one or more sensor measurements representing an operating parameter of a monitored asset from the received data;
comparing selected ones of the sensor measurements to respective predetermined alarm set points;
determining a respective safety function output for the selected sensor measurements based upon the sensor measurement comparison, the respective safety function output representing a first status estimate for the monitored asset; and
transmit the safety function output;
a second processor configured to:
execute a plurality of shadow functions during different respective portions of at least one diagnostic interval, each shadow function corresponding to a respective safety function and configured to:
receive the same one or more sensor measurements received by its corresponding safety function; and
determine a shadow function output for the corresponding safety function during its respective portion of the at least one diagnostic interval, wherein the shadow function output represents a second status estimate for the monitored asset and is configured to replicate the safety function output of the corresponding safety function when the safety function output and the shadow function output are free from error; and
transmit the shadow function output for each safety function output;
a third processor, different from the first and second processors, and configured to:
validate each safety function output by comparing the safety function output with its corresponding shadow function output, and
output a condition for the monitored asset based upon the validation comparison; and
at least one relay configured to receive the output condition, and trigger actuation of a corresponding relay contact to transmit a corresponding signal for annunciation of the output condition.

2. The diagnostic system of claim 1, wherein the output condition is a first condition when the safety function output differs from its corresponding shadow function output by greater than a predetermined fault tolerance, and wherein the first condition represents an error in determining at least one of the first status estimate and the second status estimate.

3. The diagnostic system of claim 1, wherein the output condition is a second condition when the safety function output and the shadow function output are equivalent within a predetermined tolerance.

4. The diagnostic system of claim 3, wherein the second condition indicates no asset fault is detected.

5. The diagnostic system of claim 3, wherein the second condition indicates that an asset fault is detected.

6. The diagnostic system of claim 1, wherein the second processor is configured to:
determine a first shadow function output corresponding to a first safety function of the plurality of safety functions only during a first portion of the diagnostic interval,
determine a second shadow function output corresponding to a second safety function of the plurality of safety functions only during a second portion of the diagnostic interval, the second portion of the diagnostic interval following immediately after the first portion of the diagnostic interval.

7. The diagnostic system of claim 1, wherein the diagnostic interval is a maximum time duration permitted to validate each sensor measurement of the safety function by the shadow function.

8. The diagnostic system of claim 1, wherein the first processor is configured to:
execute a first safety function during a first diagnostic interval, wherein the executed first safety function is configured to perform operations including,
determining one or more first sensor measurements from the received data;
comparing selected ones of the first sensor measurements to respective predetermined alarm set points; and
determining a safety function output for the selected first sensor measurements based upon the first sensor measurement comparison;
execute a second safety function during a second diagnostic interval, wherein the executed second safety function is configured to perform operations including,
determining one or more second sensor measurement from the received data;
comparing selected ones of the second sensor measurements to respective predetermined alarm set points; and
transmitting a safety function output for the selected second sensor measurements based upon the second sensor measurement comparison.

9. The diagnostic system of claim 8, wherein the shadow function is configured to,
determine first shadow function outputs corresponding to the selected first sensor measurements during different respective portions of a first diagnostic interval, and
determine second shadow function outputs corresponding to the selected second sensor measurements during different respective portions of a second diagnostic interval immediately following the first diagnostic interval.

10. A diagnostic method, comprising:
receiving, by selected ones of a plurality of processors, data acquired by a sensor;
executing, by a first processor of the plurality of processors, a plurality of safety functions, wherein the executed safety function is configured to perform operations including:
determining one or more sensor measurements representing an operating parameter of a monitored asset from the received data;
comparing selected ones of the sensor measurements to respective predetermined alarm set points; and
determining a safety function output for the selected sensor measurements based upon the sensor measurement comparison, the safety function output representing a first status estimate for the monitored asset; and
transmitting, by the first processor, the safety function output;
executing, by a second processor of the plurality of processors, a plurality of shadow functions during different respective portions of at least one diagnostic interval, each shadow function corresponding to a respective safety function and configured to:
receive the same one or more sensor measurements received by its corresponding safety function; and
determine a shadow function output for the corresponding safety function during its respective portion of the at least one diagnostic interval, wherein the shadow function output represents a second status estimate for the monitored asset and is configured to replicate the safety function output of the corresponding safety function when the safety function output and the shadow function output are free from error; and
transmitting, by the second processor, the shadow function output for safety function output;
receiving, by a third processor of the plurality of processors that is different from the first and second processors, the safety function output and the shadow function output;
validating, by the third processor, each safety function output by comparing the safety function output with its corresponding shadow function output,
outputting, by the third processor, a condition for the monitored asset based upon the validation comparison;
receiving, by at least one relay, the output condition; and
triggering actuation of a corresponding relay contact to transmit a corresponding signal for annunciation of the output condition.

11. The method of claim 10, wherein the output condition is a first condition when the safety function output differs from its corresponding shadow function output by greater than a predetermined fault tolerance, and wherein the first condition represents an error in determining at least one of the first status estimate and the second status estimate.

12. The method of claim 10, wherein the output condition is a second condition when the safety function output and the shadow function output are equivalent within a predetermined tolerance.

13. The method of claim 12, wherein the second condition is a no asset fault status.

14. The method of claim 12, wherein the second condition is an asset fault condition.

15. The method of claim 10, further comprising executing, by the first processor, a plurality of safety functions, and wherein the executed shadow function is further configured to:
determine a first shadow function output corresponding to a first safety function of the plurality of safety functions only during a first portion of the diagnostic interval,
determine a second shadow function output corresponding to a second safety function of the plurality of safety functions only during a second portion of the diagnostic interval, the second portion of the diagnostic interval following immediately after the first portion of the diagnostic interval.

16. The method of claim 10, wherein the diagnostic interval is a maximum time duration permitted to validate each sensor measurement of the safety function by the shadow function.

17. The method of claim 10, wherein the first processor is further configured to:
execute a first safety function during a first diagnostic interval, wherein the executed first safety function is configured to perform operations including,
determining one or more first sensor measurements from the received data;
comparing selected ones of the first sensor measurements to respective predetermined alarm set point; and
determining a safety function output for the selected first sensor measurements based upon the first sensor measurement comparison; and
transmitting the safety function output to the third processor;

execute a second safety function during a second diagnostic interval, wherein the executed second safety function is configured to perform operations including:
  determining one or more second sensor measurements from the received data;
  comparing selected ones of the second sensor measurements to respective predetermined alarm set points; and
  determining a safety function output for the selected second sensor measurements based upon the second sensor measurement comparison.

18. The method of claim 17, wherein the shadow function is configured to,
  determine first shadow function outputs corresponding to the selected first sensor measurements during different respective portions of the first diagnostic interval, and
  determine second shadow function outputs corresponding to the second sensor measurements during different respective portions of the second diagnostic interval immediately following the first diagnostic interval.

* * * * *